（12）United States Patent
Wu

(10) Patent No.: US 7,936,394 B2
(45) Date of Patent: *May 3, 2011

(54) MOBILE DEVICES HAVING AN IMAGE SENSOR FOR CHARGING A BATTERY

(75) Inventor: Raymond Wu, Cupertino, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 163 days.

This patent is subject to a terminal disclaimer.

(21) Appl. No.: 12/127,158

(22) Filed: May 27, 2008

(65) Prior Publication Data

US 2008/0225160 A1 Sep. 18, 2008

Related U.S. Application Data

(63) Continuation of application No. 10/808,655, filed on Mar. 24, 2004, now Pat. No. 7,405,763.

(51) Int. Cl.
H04N 5/225 (2006.01)

(52) U.S. Cl. ........................................ 348/372

(58) Field of Classification Search ............ 348/207.99, 348/372
See application file for complete search history.

(56) References Cited

U.S. PATENT DOCUMENTS

| 5,742,044 | A | * | 4/1998 | Battersby | 250/208.1 |
| 6,661,462 | B2 | | 12/2003 | Ohnogi | 348/372 |
| 6,774,946 | B1 | * | 8/2004 | Misawa et al. | 348/372 |
| 6,778,212 | B1 | * | 8/2004 | Deng et al. | 348/222.1 |
| 6,803,553 | B1 | | 10/2004 | Tian | 250/208.1 |
| 7,068,319 | B2 | | 6/2006 | Barna et al. | 348/372 |
| 7,230,649 | B2 | * | 6/2007 | Takahashi et al. | 348/372 |
| 7,405,763 | B2 | * | 7/2008 | Wu | 348/372 |
| 2002/0101528 | A1 | * | 8/2002 | Lee et al. | 348/304 |
| 2003/0011695 | A1 | | 1/2003 | Roustaei | 348/310 |
| 2003/0058352 | A1 | * | 3/2003 | Nishijima et al. | 348/231.1 |
| 2003/0107659 | A1 | * | 6/2003 | Takahashi et al. | 348/222.1 |
| 2003/0146372 | A1 | * | 8/2003 | Hsish et al. | 250/214.1 |
| 2004/0125421 | A1 | * | 7/2004 | Sato | 358/513 |
| 2004/0165101 | A1 | * | 8/2004 | Miyanari et al. | 348/363 |
| 2004/0257463 | A1 | | 12/2004 | Goris et al. | 348/372 |

FOREIGN PATENT DOCUMENTS

| EP | 1309178 | 5/2003 |
| JP | 0206330 | 3/1990 |
| JP | 2003008958 | 1/2003 |
| WO | WO-00/38415 | 6/2000 |

* cited by examiner

Primary Examiner — Tuan Ho
Assistant Examiner — Kent Wang
(74) Attorney, Agent, or Firm — Lathrop & Gage

(57) ABSTRACT

Mobile devices and methods of operating mobile devices are disclosed herein. In one embodiment, a mobile device includes a rechargeable battery, a battery charger electrically coupled to the battery, and an image sensor operably coupled to the battery charger to selectively charge the battery. As such, the image sensor is configured to capture images and provide current to charge the battery. The image sensor can be a CMOS image sensor or a CCD image sensor. The mobile device may further include a housing, with the battery, battery charger, and image sensor contained within the housing.

20 Claims, 3 Drawing Sheets

MOBILE DEVICES HAVING AN IMAGE SENSOR FOR CHARGING A BATTERY

CROSS REFERENCE FOR RELATED APPLICATION

This application is a divisional application of U.S. patent application Ser. No. 10/808,655, filed Mar. 24, 2004 and is hereby incorporated herein by reference.

TECHNICAL FIELD

The present invention relates to mobile devices with image sensors, and more particularly, to image sensors that selectively charge the battery in the mobile device.

BACKGROUND

Integrated circuit technology has revolutionized various fields including computers, control systems, telecommunications, and imaging. In the imaging field, for example, CMOS image sensors have proved to be less expensive to manufacture than CCD imaging devices. Moreover, for certain applications, CMOS devices are superior in performance. Furthermore, the necessary signal processing logic on a CMOS image sensor can be integrated alongside the imaging circuitry, thus allowing for a single integrated chip to form a complete stand-alone imaging device. In other applications, however, CCD imaging devices still have some advantages.

Image sensors are used to produce an image representing an object. The primary building block for an image formed by an image sensor is a pixel. Image sensors typically include a two-dimensional array of pixels arranged in rows and columns. The number, size, and spacing of the pixels determine the resolution of the image generated by the imaging device. The pixels of an image sensor are semiconductor devices that transform incident light photons into current signals. The photosignals are proportional to the amount of light reflected from an object to be imaged.

In the array, pixels belonging to the same column (also referred to as bit line) are usually connected at a common output node. At the output node, a column readout circuit reads out and amplifies the photosignals from each pixel in the individual column. Typically, the pixels are read out row-by-row by asserting a row select signal to each pixel of the selected row. After the photosignals are read out, the signals are processed by signal processing circuitry to create an image representing the object.

Personal digital assistants (PDAs), digital cameras, cell phones, and other portable electronic devices often include camera units with image sensors to capture images. These mobile devices include a battery to power the image sensor and other components of the device. Although CMOS imager sensors consume less power than CCD image sensors, both types of image sensors drain the battery. Power consumption is an issue in portable electronic devices because the charge in a typical battery lasts for a relatively short time. To recharge the battery, the device is generally coupled to an AC outlet or another power source. As such, the mobility of the device is reduced during charging. Accordingly, a need exists to reduce the frequency with which the battery of a mobile device must be recharged.

SUMMARY

Several aspects of the invention are directed to mobile devices and methods of operating mobile devices. The mobile devices can be cellular phones, personal digital assistants (PDAs), video game consoles, digital cameras, digital camcorders, computing devices, wireless communication devices, and/or other portable electronic devices. In one embodiment, a mobile device includes a rechargeable battery, a battery charger electrically coupled to the battery, and an image sensor operably coupled to the battery charger to selectively charge the battery. As such, the image sensor is configured to capture images and provide current to charge the battery. The image sensor can be a CMOS image sensor or a CCD image sensor. The mobile device may further include a housing, with the battery, battery charger, and image sensor contained within the housing.

In one aspect of this embodiment, the image sensor includes an array of pixels and a timing/control circuit for controlling the pixels to selectively provide constant current from the pixels to the battery charger. The array of pixels can be arranged in columns, and the timing/control circuit can selectively control the pixels so that multiple pixels in an individual column provide current to the battery charger simultaneously. In another aspect of this embodiment, the mobile device further includes a signal processor and a switch to (a) direct current from the pixels to the signal processor when the image sensor captures images, and (b) direct current from the pixels to the battery charger when the battery charger charges the battery.

Another aspect of the invention is directed to methods for operating mobile devices. In one embodiment, a method includes capturing an image with an image sensor in the mobile device, and charging a battery in the mobile device with the image sensor. Charging the battery can occur before and/or after capturing the image. In one aspect of this embodiment, capturing the image includes powering the image sensor with the battery.

Sizes of components are not drawn to scale, and various components may be enlarged or reduced to improve drawing legibility. Component details have been abstracted in the Figures to exclude details such as the position of components and the precise connections between such components when such details are unnecessary to the invention.

DETAILED DESCRIPTION

In the following description, numerous specific details are provided, such as the identification of various components of mobile devices, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "a embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
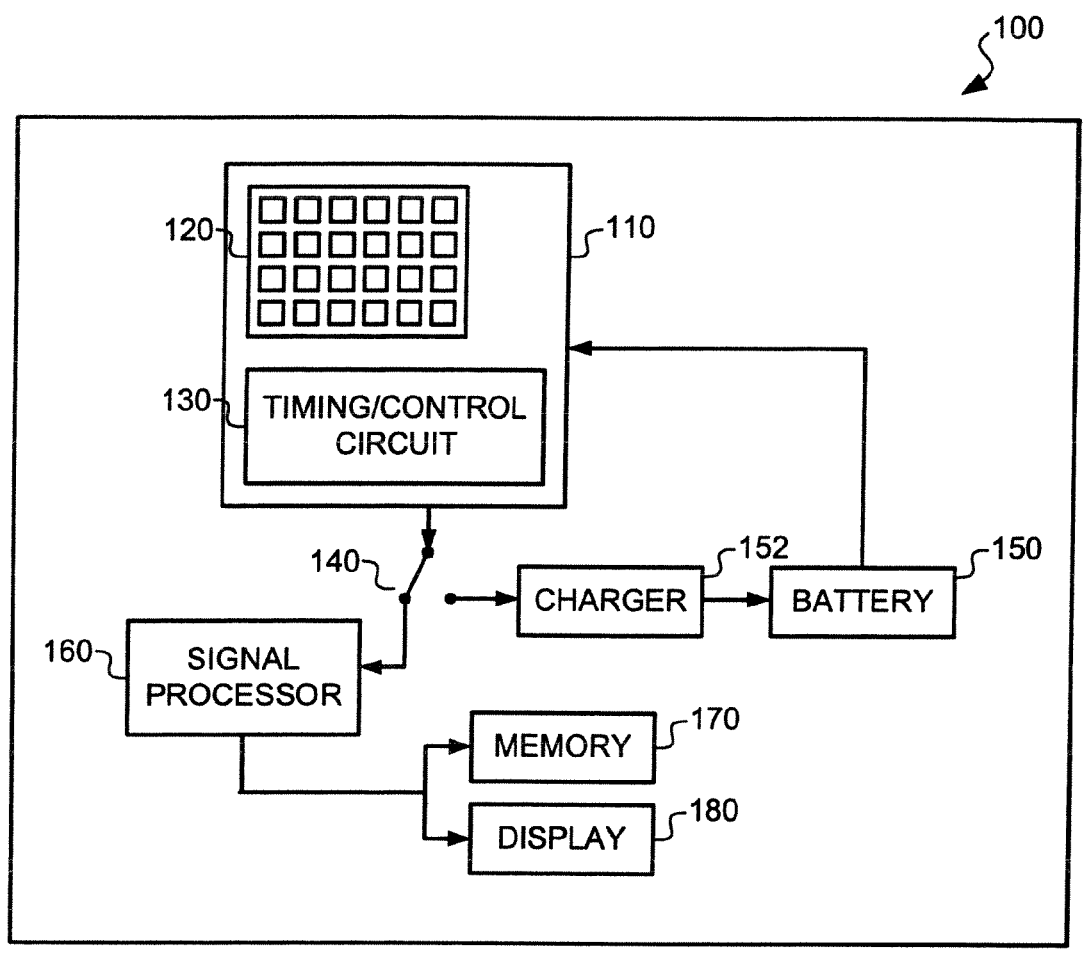
FIG. 1 is a schematic representation of a mobile device including an image sensor in accordance with one embodiment of the invention.

FIG. 1 is a schematic representation of a mobile device 100 including an image sensor 110 in accordance with one embodiment of the invention. The mobile device 100 can be a cellular phone, a personal digital assistant (PDA), a video game console, a digital camera, a digital camcorder, a computing device, a wireless communication device, or another portable electronic device. As described in greater detail below, the image sensor 110 is configured to selectively capture images of desired objects and provide current to recharge a battery in the mobile device 100.

The illustrated mobile device 100 includes a signal processor 160, memory 170 electrically coupled to the signal processor 160, and a display 180 electrically coupled to the signal processor 160. The signal processor 160 is operably coupled to the image sensor 110 for processing signals generated by an array of pixels 120 on the image sensor 110. For example, when the image sensor 110 captures an image, the signal processor 160 can compress the signals (using image compression schemes such as JPEG, M-JPEG or MPEG) to reduce the data size and route the compressed signals to the memory 170. Moreover, the signal processor 160 can condition the signals from the image sensor 110 so that they are compatible with the display 180. Accordingly, the signal processor 160 can include one or more image encoders and decoders, memory, processor, microcontrollers, buffer, routers, timing circuitry, analog-to-digital converters, calibration circuitry, control circuitry, image processing circuitry (such as chromaticity), luminance signal processing circuitry, and/or other circuitry to process signals generated by the image sensor 110.

The memory 170 can include volatile memory and/or nonvolatile memory for storing signals from the signal processor 160. The display 180 can be attached, embedded, or otherwise native to the mobile device 100 to display signals from the signal processor 160. The display 180 can be one of a variety of display types suitable for mobile devices, such as liquid crystal display (LCD) or touchscreen. Moreover, the display 180 can be a monochrome or color display. In other embodiments, the mobile device 100 may also include a transceiver configured to transmit and receive wireless signals to and from another wireless device, and the signal processor 160 can compress and/or condition the signals for transmission to another device.

The components of the mobile device 100 may be embodied as hardware, firmware, and/or software. For example, the image sensor 110 and the signal processor 160 may comprise one chip, and the memory 170 may comprise yet another chip. Alternatively, the functionality of two or more chips may be embodied in a single chip such as a system-on-chip (SOC). It should also be understood that one or more components illustrated in FIG. 1 may be omitted depending on the mobile device. Moreover, if the mobile device 100 is used primarily for capturing images/video, then more than one memory unit or a detachable or swappable memory unit, may be included in the mobile device 100.

The illustrated mobile device 100 further includes a battery 150 and a battery charger 152 both of which are contained within the housing of the device 100. The battery 150 powers the image sensor 110 and the other components of the device 100, and the battery charger 152 is operably coupled to the image sensor 110 to selectively charge the battery 150. More specifically, when the image sensor 110 is not capturing an image, the pixels 120 can provide signals or current to the battery charger 152 for charging the battery 150.

In one embodiment, the mobile device 100 includes a switch 140 movable between a first position (shown in FIG. 1) and a second position (not shown). In the first position, the switch 140 directs current from the image sensor 110 to the signal processor 160 so that the mobile device 100 can capture images. In the second position, the switch 140 directs current from the image sensor 110 to the battery charger 152 for charging the battery 150. The switch 140 can be operably coupled to an actuatable switch (not shown) on the mobile device 100 that a user actuates to capture an image. In this case, the switch 140 moves from the second position to the first position when the user actuates the switch. After the image is captured, the switch 140 can move back to the second position.

The image sensor 110 can be a single-chip color CMOS image sensor, such as those manufactured by Omnivision Technologies, Inc. of Sunnyvale, Calif., the assignee of the present invention. Such CMOS image sensors provide advantages over image sensors that use charge-coupled devices (CCDs), in that CCD image sensors have large sizes and power consumption that are not well suited for mobile devices. In additional embodiments, however, the image sensor can be a CCD.

The illustrated image sensor 110 includes an array of pixels 120 and a timing/control circuit 130 operably coupled to the pixels 120. The timing/control circuit 130 operates the pixels 120 so that the pixels 120 produce signals either (a) in a sequence for the signal processor 160 to process, or (b) continuously and simultaneously for use in charging the battery 150. As such, the timing/control circuit 130 can be operably coupled to the switch 140 and/or the actuatable switch discussed above so that the current from the pixels 120 is provided to the signal processor 160 or battery charger 152.

Figure 2:
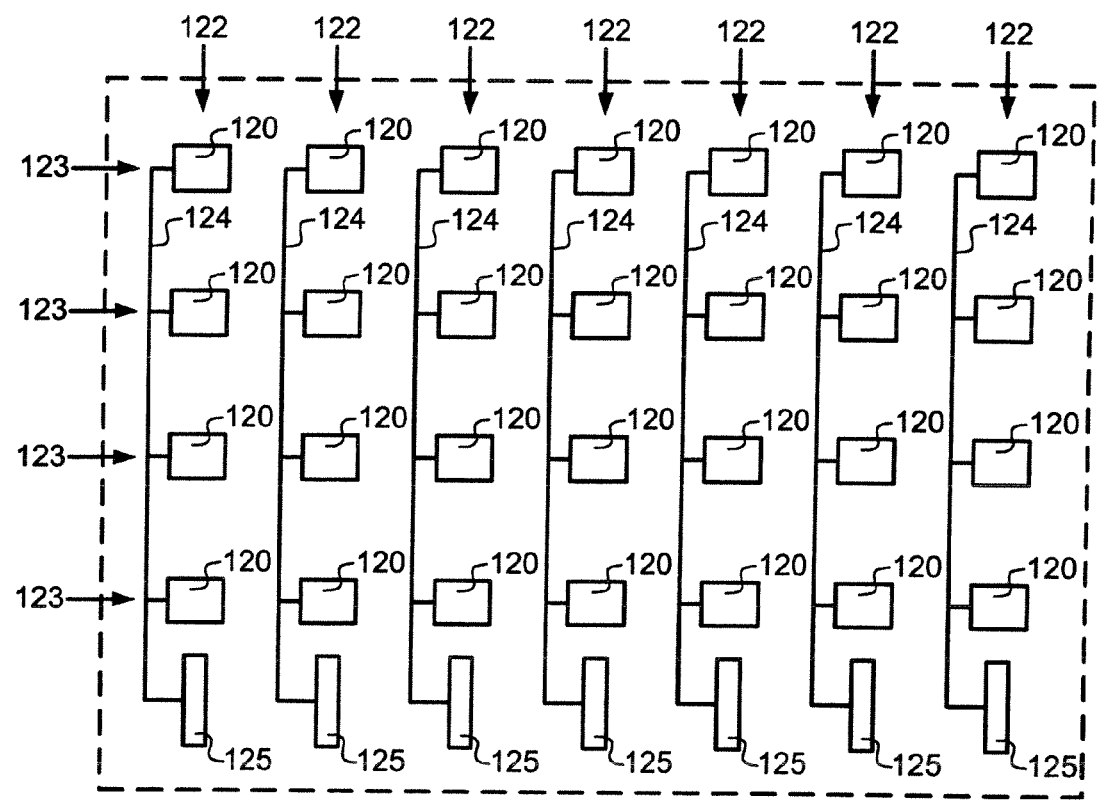
FIG. 2 is an enlarged schematic representation of a pixel array in the age sensor of FIG. 1.

FIG. 2 is an enlarged schematic representation of the two-dimensional array of pixels 120 of FIG. 1. The pixels 120 are arranged in columns 122 and rows 123, and although the illustrated embodiment includes seven columns 122 and four rows 123, other embodiments may include a different number of rows and columns. The individual pixels 120 are configured to convert incident light into an electrical signal, with the strength of the signal corresponding to the amount of light impinging on the pixel 120. These electrical signals can be used to charge the battery 150 (FIG. 1) or produce a digital image of the object reflecting light towards the pixels 120.

In one embodiment, the individual pixels 120 include a photodiode for generating an electrical signal and a transistor for controlling when the signal is output. Each pixel 120 in an individual column 122 outputs the electrical signal to a column signal line 124, which in turn transmits the signal to a column readout circuit 125. Although the column readout circuits 125 are shown at the "bottom" of FIG. 2 for convenience purposes, the column readout circuits 125 can be placed almost anywhere on the integrated circuit relative to the array of pixels 120.

Referring to both FIGS. 1 and 2, when the image sensor 110 is used to capture an image of an object, the photodiodes generate electrical signals corresponding to the amount of light striking the pixels 120. The timing/control circuit 130 operates the pixels 120 so that the electrical signals of the pixels 120 are read out sequentially row-by-row. More specifically, one pixel 120 in each column 122 transmits its signal to the column readout circuit 125 at a single time. After the signals from one row 123 of pixels 120 are transmitted and read out at the column readout circuit 125, a subsequent row 123 of pixels 120 transmits signals to the column readout circuit 125. These signals are in turn transmitted from the column readout circuits 125 to the signal processor 160.

When the image sensor 110 is used to charge the battery 150, the timing/control circuit 130 operates the pixels 120 so that the electrical signals from most, if not all, of the pixels 120 are transmitted simultaneously to the corresponding column readout circuits 125. Accordingly, more than one pixel 120 in each column 122 simultaneously transmits signals to the corresponding column readout circuit 125. Moreover, the pixels 120 continuously transmit signals to provide continuous current. The current from the pixels 120 is provided to the battery charger 152 to charge the battery 150.

Figure 3:
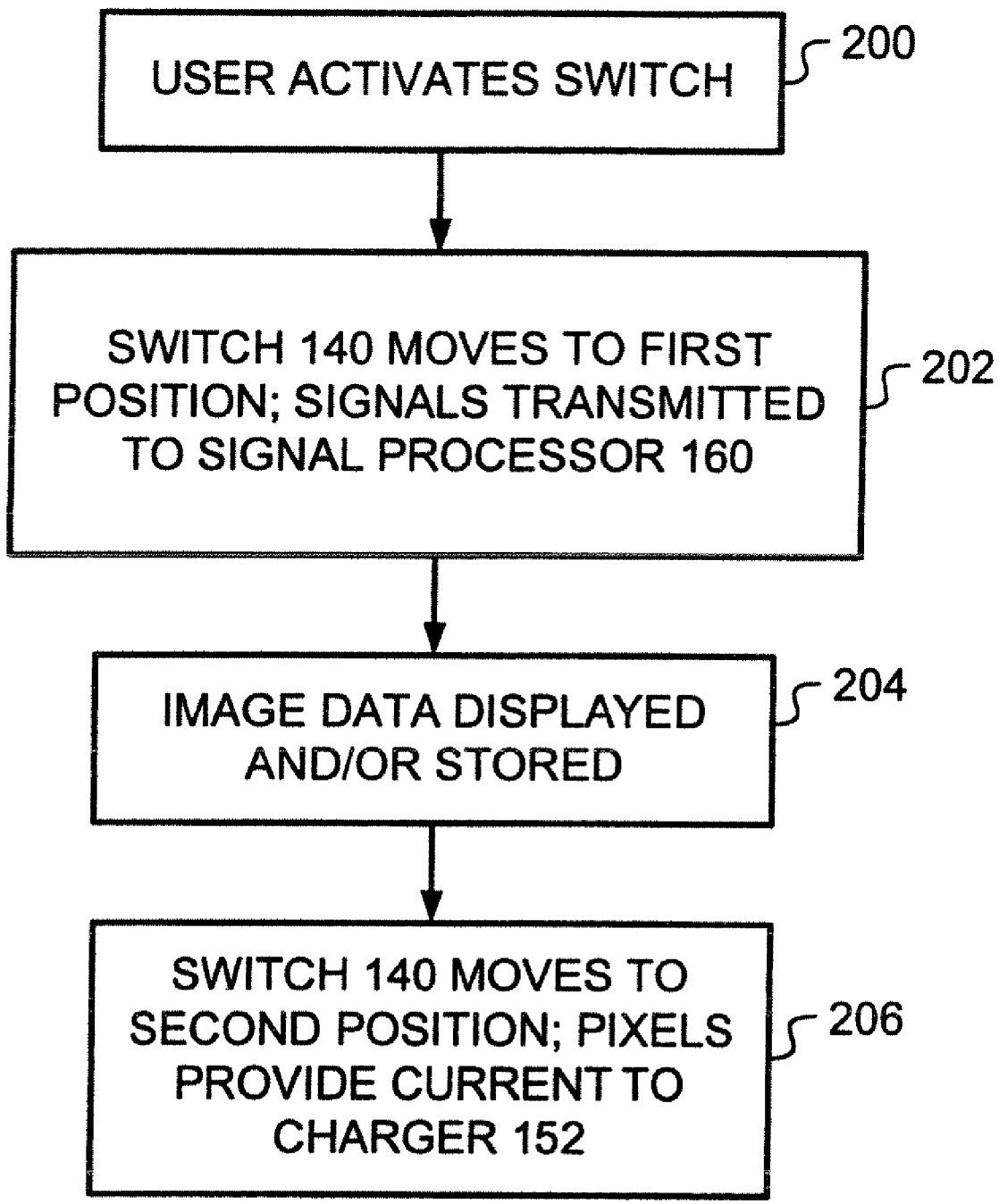
FIG. 3 is a flow diagram illustrating the operation of the mobile device of FIG. 1 in accordance with one embodiment of the invention.

FIG. 3 is a flow diagram illustrating the operation of the mobile device 100 in accordance with one method of an invention. Referring to FIGS. 1-3, at block 200, the user actuates a switch to capture an image of an object. At block 202, the switch 140 moves to the first position and the pixels 120 provide signals sequentially row-by-row to the column readout circuits 125 and, in turn, to the signal processor 160. At block 204, the signal processor 160 provides image data to the display 180 and/or the memory 170. At block 206, the switch 140 moves from the first position to the second position and the pixels 120 simultaneously provide continuous current to the charger 152 for charging the battery 150.

One feature of the mobile device 100 illustrated in FIGS. 1 and 2 is that the image sensor 110 is configured to capture images and provide current to charge the battery 150. As such, the image sensor 110 can provide current from the pixels 120 to the battery charger 152 when the image sensor 110 is not capturing an image. An advantage of this feature is that the frequency with which the mobile device 100 must be plugged into an AC power outlet to recharge the battery 150 is reduced.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portion of this application. When the claims use the words "or" in reference to a list of two or more items, that word covers all of the following interpretations of the word: any of the items in the list, all of the items in the list, and any combination of the items in the list.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A mobile device, comprising:
a battery charger;
a signal processor;
a complementary metal oxide semiconductor (CMOS) image sensor having an array of pixels organized into columns and rows, the CMOS image sensor configured to capture images and provide current to the battery charger;
a plurality of column readout circuits electrically coupled to the array of pixels, each column readout circuit corresponding to a respective column of the array of pixels;
a timing/control circuit within the image sensor and operably coupled to the array of pixels; and
a switch external to the image sensor, wherein the image sensor is configured to switch from an image capture mode to a battery charging mode or from the battery charging mode to the image capture mode by a user actuating the switch external to the image sensor, wherein in the image capture mode the timing/control circuit is configured to direct said array of pixels to be read out in a sequence to provide image data to the signal processor, while in the battery charging mode the timing/control circuit is configured to directs multiple pixels in each individual column to simultaneously and continuously transmit signals to corresponding column readout circuits to provide current to the battery charger to charge a battery.

2. The mobile device of claim 1, wherein the timing/control circuit is configured to direct all of the active pixels in each column converting light into electricity to simultaneously provide current to the battery charger in the battery charging mode.

3. The mobile device of claim 1, wherein the mobile device is configured to switch to the battery charging mode during time periods when images are not being captured to support charging of the battery.

4. The mobile device of claim 1, wherein said battery is configured to power said mobile device when images are captured.

5. The mobile device of claim 1, wherein the switch has two switch positions and couples the image sensor to the signal processor and the battery charger, the switch having a first switch position to direct current from the image sensor to the signal processor in the image capture mode and a second switch position to direct current from the image sensor to the battery charger in the battery charging mode.

6. The mobile device of claim 1, wherein the timing/control circuit in the image capture mode directs one pixel per column to transmit a signal to a corresponding column readout circuit at a single time.

7. The mobile device of claim 6, wherein in the battery charging mode most of the pixels in each column are directed to transmit signals to corresponding column readout circuits.

8. The mobile device of claim 6, wherein in the battery charging mode all of the pixels in each column converting light into electrical signals are directed to transmit corresponding signals to corresponding column readout circuits.

9. The mobile device of claim 1, wherein the image sensor is a single-chip color CMOS image sensor.

10. The mobile device of claim 9, wherein said image sensor, signal processor, and timing/control circuit are on one chip.

11. A mobile device, comprising:
a single-chip color complementary metal oxide semiconductor (CMOS) image sensor for capturing images, the CMOS image sensor having an array of pixels organized into columns and rows with each column having a separate column readout circuit and individual pixels associated with an individual column being electrically coupled to a respective column readout circuit; and
a timing/control circuit operably coupled to the array of pixels; and
a switch external to the image sensor, wherein the image sensor is configured to switch from an image capture mode to a battery charging mode or from the battery charging mode to the image capture mode by a user actuating the switch external to the image sensor, wherein in the image capture mode the timing/control circuit is configured to direct pixels to be read out in a sequence selected to provide image data to a signal processor, while in the battery charging mode the timing/control circuit is configured to directs multiple pixels in each individual column to simultaneously and continuously transmit signals to corresponding column readout circuits to provide continuous current to a battery charger.

12. The mobile device of claim 11 wherein the timing/control circuit is configured to selectively control the pixels so that in the battery charging mode most of the pixels in an individual column provide current to the battery charger simultaneously.

13. The mobile device of claim 11 wherein the timing/control circuit is configured to selectively control the pixels so that in the battery charging mode all of the pixels in an individual column provide current to the battery charger simultaneously.

14. The mobile device of claim 11, wherein the timing/control circuit is configured to operate in the battery charging mode when an image is not being captured.

15. The mobile device of claim 11, wherein in the image capture mode pixels are configured to read out sequentially on a row-by-row basis.

16. A method of operating an image sensor, comprising:
in an image capture mode, directing an array of pixels to be readout in a sequence selected to provide image data to a signal processor;
in a battery charging mode, directing multiple pixels per column in the array of pixels to simultaneously and continuously transmit signals to a plurality of column readout circuits, each column readout circuit corresponding to a respective column of the array of pixels, to provide current for charging a battery; and
switching between the image capture mode and the battery charging mode by a user actuating a switch external to the image sensor.

17. The method of claim 16, further comprising, in the image capture mode, reading out pixels on a row-by-row basis.

18. The method of claim 16, further comprising, in the battery charging mode, directing all pixels converting light into electricity to simultaneously and continuously provide current for charging the battery.

19. The method of claim 16, further comprising operating the image sensor in the battery charging mode when an image is not being captured.

20. The method of claim 16, further comprising:
directing the operation of the switch to a first switch position in the image capture mode to couple the image sensor to the signal processor; and
directing the operation of the switch to a second switch position in the battery charging mode to couple the image sensor to a battery charger.

* * * * *